US008282860B2

(12) United States Patent
Chung et al.

(10) Patent No.: US 8,282,860 B2
(45) Date of Patent: Oct. 9, 2012

(54) PROCESS FOR PREPARATION OF SILVER NANOPARTICLES, AND THE COMPOSITIONS OF SILVER INK CONTAINING THE SAME

(75) Inventors: Kwang-Choon Chung, Gyeonggi-do (KR); Hyun-Nam Cho, Gyeonggi-do (KR); Byung Hun Kim, Gyeonggi-do (KR); Su Han Kim, Gyeonggi-do (KR); Myung Bong Yoo, Gyeonggi-do (KR); Nam Boo Cho, Gyeonggi-do (KR); Yi Sup Han, Gyeonggi-do (KR)

(73) Assignee: Inktec Co., Ltd. (KR)

( * ) Notice: Subject to any disclaimer, the term of this patent is extended or adjusted under 35 U.S.C. 154(b) by 490 days.

(21) Appl. No.: 12/376,893

(22) PCT Filed: Aug. 2, 2007

(86) PCT No.: PCT/KR2007/003736
§ 371 (c)(1),
(2), (4) Date: Sep. 3, 2009

(87) PCT Pub. No.: WO2008/018718
PCT Pub. Date: Feb. 14, 2008

(65) Prior Publication Data
US 2010/0189901 A1 Jul. 29, 2010

(30) Foreign Application Priority Data

Aug. 7, 2006 (KR) .................. 10-2006-0074246

(51) Int. Cl.
*H01B 1/00* (2006.01)

(52) U.S. Cl. ........ 252/500; 242/159; 427/121; 427/216; 429/338; 556/50; 106/1.19
(58) Field of Classification Search .................. 252/500; 427/216, 121; 428/673; 106/1.19; 242/159; 429/338; 556/50
See application file for complete search history.

(56) References Cited

U.S. PATENT DOCUMENTS 4,542,214 A 9/1985 Bechara
4,652,465 A * 3/1987 Koto et al. .................... 427/216
(Continued)

FOREIGN PATENT DOCUMENTS

JP 61-163975 * 7/1986
(Continued)

OTHER PUBLICATIONS

International Search Report—PCT/KR2007/003736 dated Nov. 12, 2007.

(Continued)

*Primary Examiner* — Khanh Tuan Nguyen
(74) *Attorney, Agent, or Firm* — Cantor Colburn LLP

(57) ABSTRACT

The present invention relates to a process for preparation of silver nanoparticles and the compositions of silver ink containing the same. The present invention can prepare the silver nanoparticles with various shapes through a simple preparation process, improve the selectivity of the size of the silver nanoparticles, fire the silver nanoparticles even at a low temperature of 150° C. or less during a short time, provide the ink compositions capable of forming the coating or the fine pattern showing the high conductivity, and provide the ink compositions capable of being applied to the reflective film material, the electromagnetic wave shield, and the antimicrobial agent, etc.

30 Claims, 4 Drawing Sheets

U.S. PATENT DOCUMENTS

| | | | |
|---|---|---|---|
| 5,957,828 A | 9/1999 | Hayashi | |
| 6,387,542 B1 * | 5/2002 | Kozlov et al. | 428/673 |
| 2002/0117652 A1 * | 8/2002 | Sano et al. | 252/500 |
| 2005/0123621 A1 | 6/2005 | Burton et al. | |

FOREIGN PATENT DOCUMENTS

| | | |
|---|---|---|
| JP | 61163975 | 7/1986 |
| JP | 7-145409 | 6/1995 |
| JP | 11-236607 | 8/1999 |
| JP | 11236607 | 8/1999 |
| JP | 2000-239713 | 9/2000 |
| JP | 2006-104576 | 4/2006 |
| JP | 2006118010 | 5/2006 |
| JP | 2008531810 | 8/2008 |
| KR | 10-2004-0047100 | 6/2004 |
| KR | 10-2005-0040226 | 5/2005 |
| KR | 10-2006-0090180 | 8/2006 |

OTHER PUBLICATIONS

Japanese Office Action—Japanese Application No. 2009-523711 issued on Apr. 17, 2012, citing JP11236607, JP61163975, JP2008531810 and JP2006118010.

* cited by examiner

[Fig. 1]
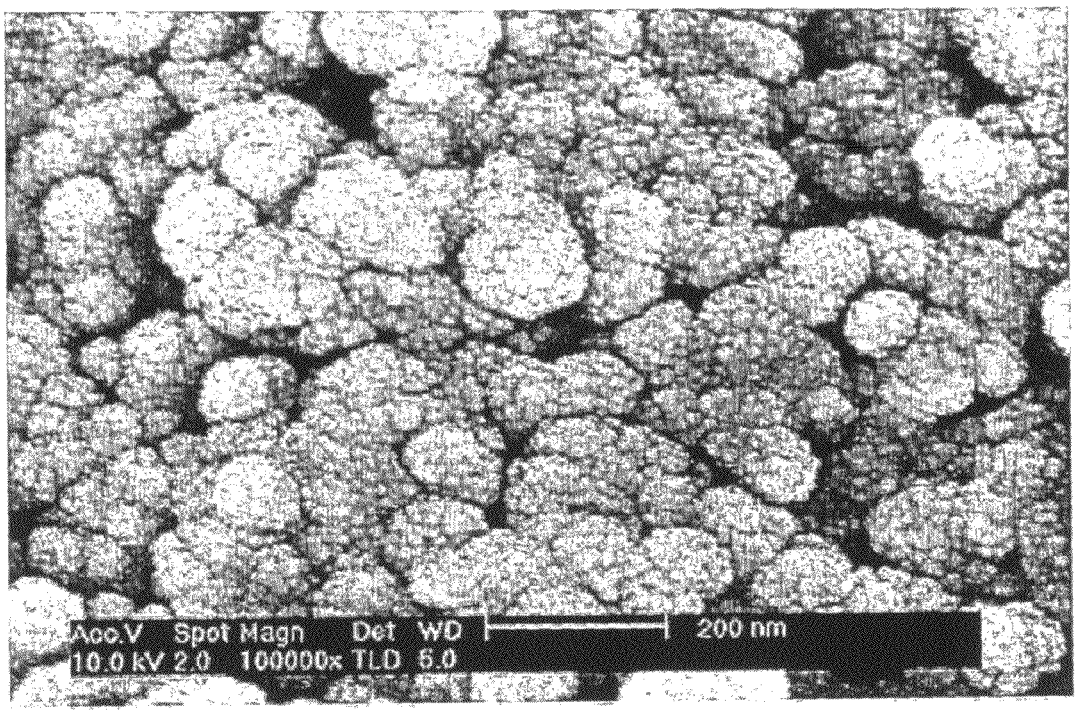
[Fig. 2]
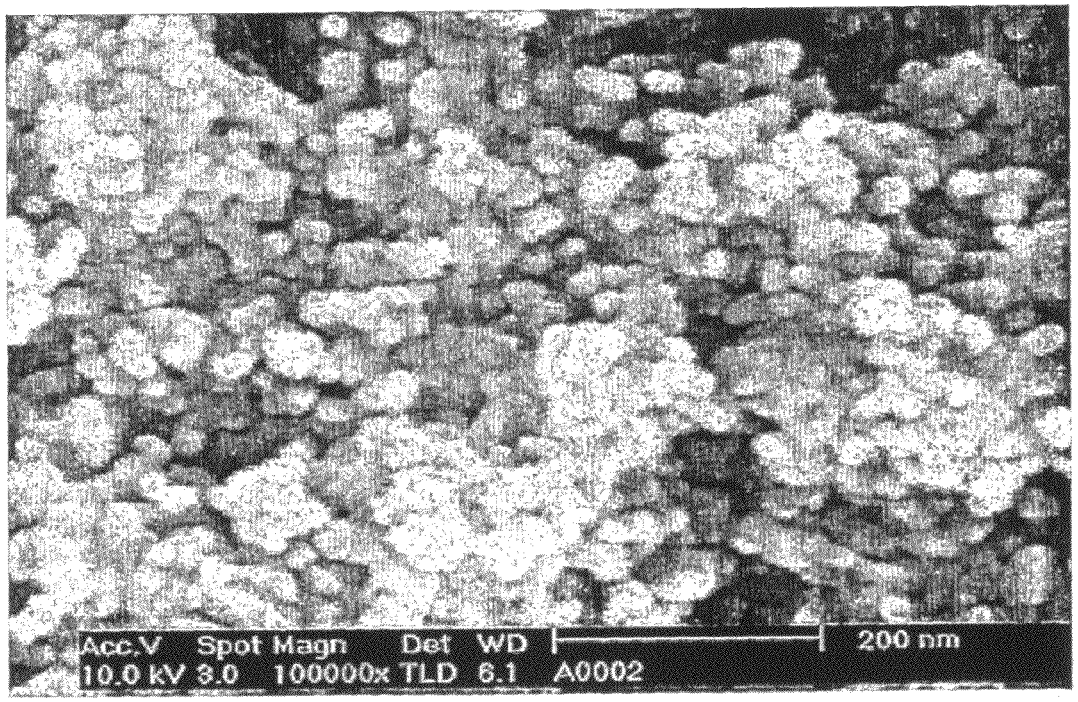

[Fig. 3]
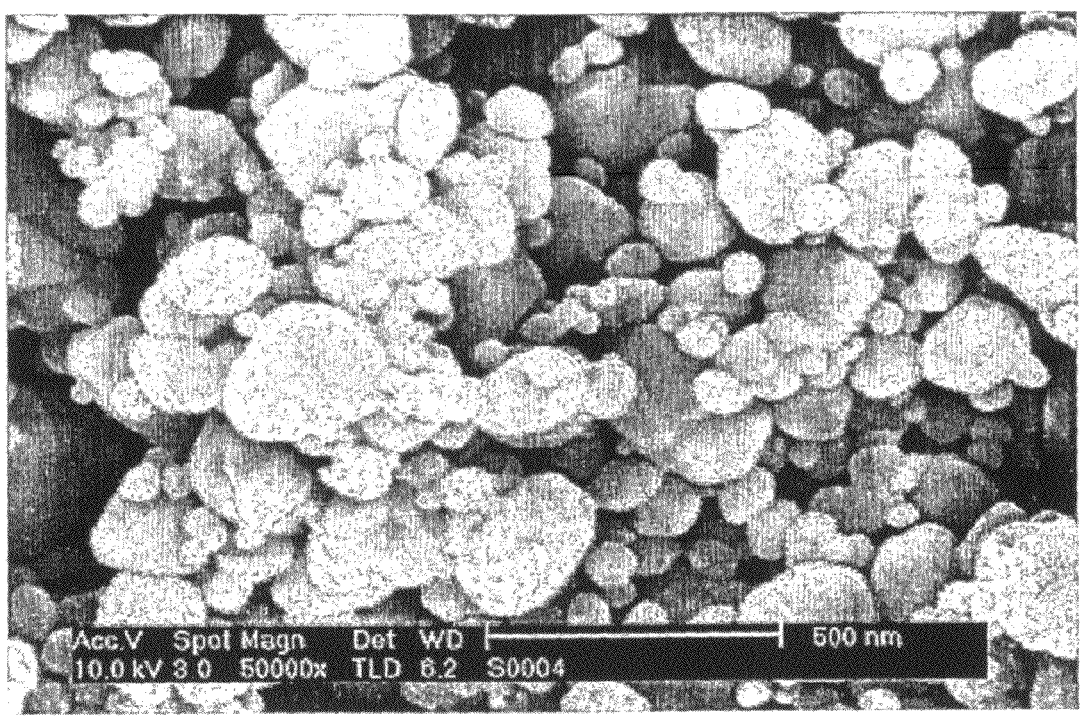

[Fig. 4]
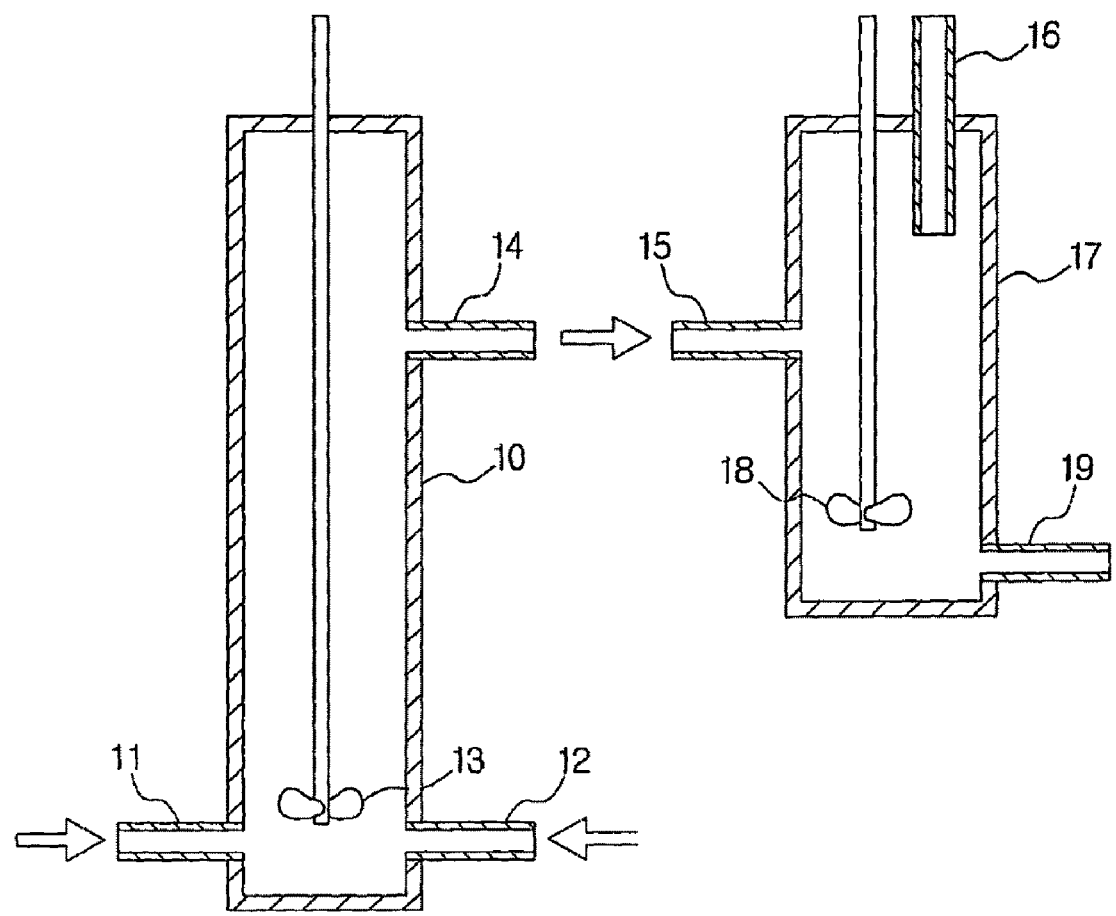

[Fig. 5]
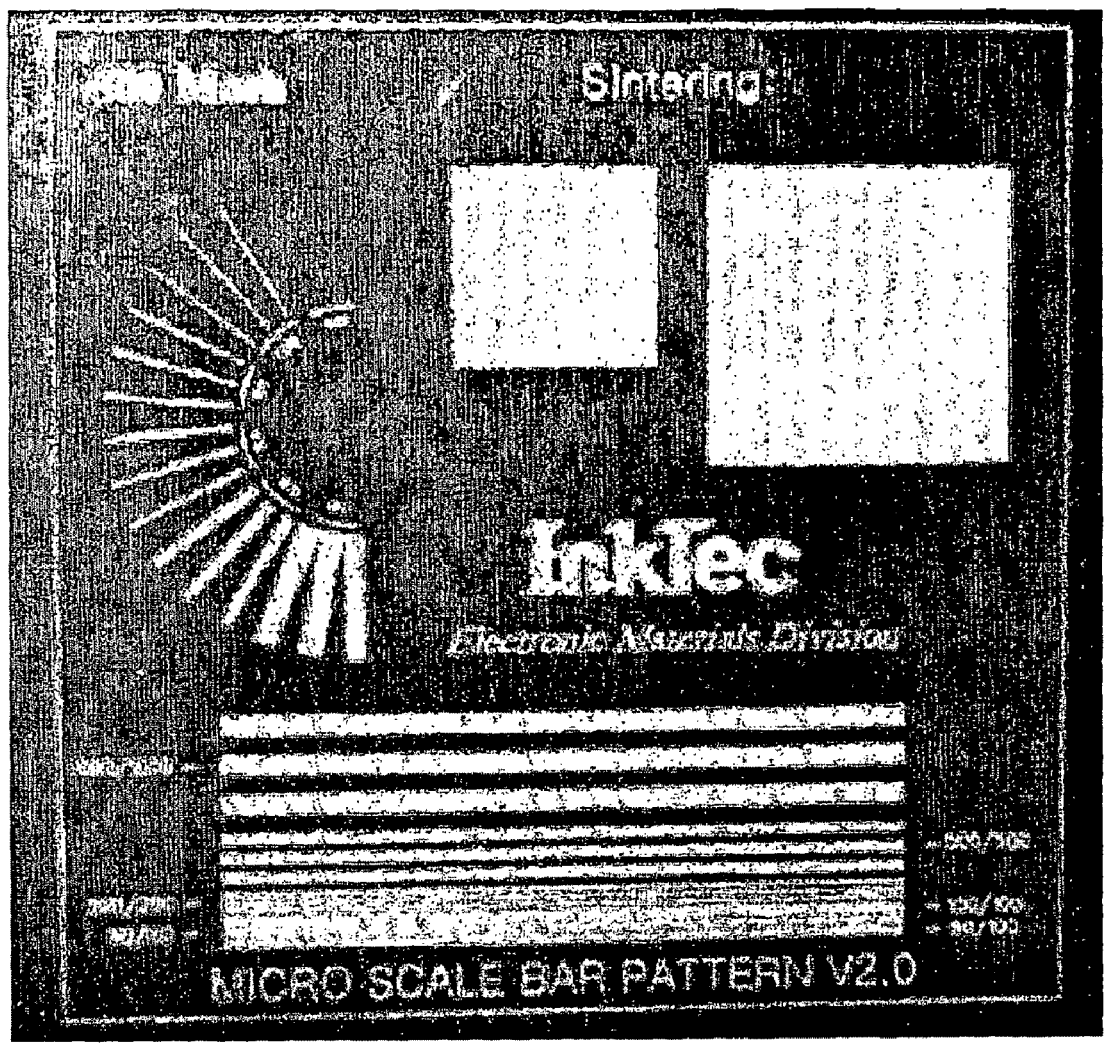

PROCESS FOR PREPARATION OF SILVER NANOPARTICLES, AND THE COMPOSITIONS OF SILVER INK CONTAINING THE SAME

TECHNICAL FIELD

The present invention relates to a process for preparation of silver complex compound and the compositions of silver ink containing the same by reacting silver complex compound with reducer and reducing or pyrolyzing the silver complex compound by applying heat thereto.

BACKGROUND ART

Silver ink containing silver complex compound has been used in various products such as conductive ink, electromagnetic wave shield, reflective film forming material, antimicrobial agent, etc. In particular, since the conductive ink has been recently spotlighted due to the regulation of lead use in an electric electronic component circuit and since it is advantageous when requiring a metal pattern or simply intending to form an electrode in new fields such as a low resistance metal wiring, a printed circuit board (PCB), a flexible printed circuit board (FPC), an antenna for a radio frequency identification (RFID) tag, an electromagenetic shield and plasma display panel (PDP), a thin film transistor liquid crystal display (TFT-LCD), an organic light emitting diode (OLED), a flexible display, and an organic thin film transistor (OTFT), etc. Also, as the electronic components tend toward compactness, the size of the metal particles used therefor becomes finer and finer.

The method for preparation of metal nanoparticles is divided into a physical method and a chemical method, wherein the physical method prepares it by physically grinding metal agglomerate and the chemical method is divided into a vapor reaction method and a liquid precipitation method.

The vapor reaction method is divided into an aerosol method preparing the metal nanoparticles by jetting a high pressure of gas, a pyrolysis method preparing powders through the pyrolysis using metal compound and gas reducer, and an evaporation/agglomeration method preparing powders by heating and evaporating evaporation materials. The liquid precipitation method is divided into a sol-gel method, a hydrothermal method, an ultrasonic decomposition method, a micro emulsion method, a liquid reduction method. In recent, the liquid reduction method using dispersant and reducer, which is easy in a shape control of powder and is highest in economy, has been the most widely used.

However, the methods preparing metal nanoparticles using the conventional liquid reduction method have disadvantages not suitable for mass production due to high preparation costs, complicated process, and low density of the metal thereof. Also, since safety is dropped or sintering temperature is high, it has various problems such that there is a limitation in being used in various kinds of substrates.

Japanese Laid-Open Patent Publication No. 2000-239713 discloses a method using ammonium polyacrylate polymer as dispersant and ascorbic acid as reducer, however, has a problem that precipitation of particles occurs.

U.S. Pat. No. 5,957,828 discloses a method for preparation of metal nanoparticles using reducer, while controlling temperature, however, has a problem in uniformity of nanoparticles.

Korean Laid-Open Patent Publication No. 2004-047100 discloses a method for preparation of nano silver powder by means of a wet reduction method, and more particularly a method for preparation of nano silver powder by means of a wet reduction method dissolving silver nitrate together with sodium dodecyl sulfate (SDS), sodium citrate (SC), polyacrylic acid (PAA), and polyvinyl pyrrolidone (PVP) to form intermediates, which are Ag—X based double compound, and injecting sodium hydroxide thereinto to generate Ag based composite oxide, and then injecting hydrazine or formaldehyde thereinto to reduce it, thereby preparing nano silver powder. However, the preparing method has a limitation in improving the preparation of various sized particles and the selectivity of particle size and has a problem in being used as ink composition, etc. due to large agglomerization of the prepared silver powder.

Korean Laid-Open Patent Publication No. 2005-040226 discloses a method for preparation of silver complex compound forming silver nitrate, which is a silver precursor, by dissolving silver in nitric acid, to dilute the prepared silver nitrate with water, adding ammonium hydroxide thereinto to form complex ions, injecting dispersant thereinto to prepare silver complex compound in a monodispersed sol state, controlling pH thereof in a base condition by means of sodium hydroxide and then reducing it by means of formaldehyde to dry it. However, it has a limitation in being used as ink composition, etc., since the control of the particle size, etc. is difficult and the silver particles are agglomerated to become an agglomerate state in a dry step so that it should be subject to a shattering process.

Therefore, it has been requested a method for preparation of silver complex compound that can minimize agglomerizaton of particles and prepare various shapes of silver complex compound, improve selectivity of the silver nanoparticle size, and be used for ink compositions to easily form a fine pattern or a uniform and densed thin film having high conductivity even when the it is fired during a short time to be suitable for being used as the ink compositions Meanwhile, the present applicant has been filed a method for preparation of Ag complex [ammonium carbamate compound, ammonium carbonate compound or ammonium bicarbonate compound] by reacting silver compound with at least one or two mixtures selected from ammonium carbamate compound, ammonium carbonate compound or ammonium bicarbonate compound, as Korean Patent Application No. 2006-0011083. The application invention is useful as a method for preparation of silver complex compound. The present invention is related to the preparing method of the application invention.

DISCLOSURE

Technical Problem

The present inventors successfully accomplish the present invention through repeated experiments in order to solve the problem. In other words, it is an object of the present invention to provide a process for preparation of silver complex compound, wherein the particles are minimized in agglomerization, controllably various in size, and suitable for being used as ink composition, by reacting silver complex compound with reducer and by reducing or pyrolyzing the silver complex compound by applying heat to it, and the compositions of silver ink containing the silver complex compound prepared in the above preparation process.

It is another object of the present invention to provide a method controlling the size of metal nanoparticles which intend to prepare by means of kinds of reducers and content change of reducers at the time of preparation of silver complex compound.

It is another object of the present invention to provide silver ink composition which can be used in various industry fields such as conductive ink material, electromagnetic wave shield, reflective film forming material, antimicrobial agent, etc., and in particular, to provide silver ink composition easily forming a fine pattern or a uniform and densed thin film having high conductivity, despite being sintering during a short time at a low temperate of 150° C. or less.

Technical Solution

A process for preparation of silver complex compound and the compositions of silver ink containing the same of the present invention to accomplish the above object will be described in detail by being divided into each step.

A process for preparation of silver complex compound according to the present invention includes:

step a) preparing silver complex compound having a special structure by reacting silver compound with at least one or two mixtures selected from ammonium carbamate compound, ammonium carbonate compound or ammonium bicarbonate compound; and step b) preparing the silver complex compound by reacting the silver complex compound prepared in the a) step with the reducer, or by reducing or pyrolyzing the silver complex compound by applying heat to it.

The process for preparation of silver complex compound according to the present invention further includes: after the step b), step c) stabilization-treating for improving agglomerization and dispersity of the particles.

Step a): A Step Preparing the Silver Complex Compound Having a Special Structure The silver complex compound preparing the silver complex compound of the present invention is prepared by reacting the silver compound represented by the following formula 1 with at least one or two mixtures selected from ammonium carbamate compound, ammonium carbonate compound or ammonium bicarbonate compound represented by the following formulas 2 to 4.

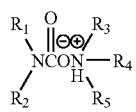
[Formula 1]

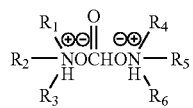
[Formula 2]

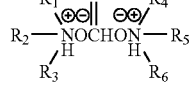
[Formula 3]

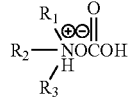
[Formula 4]

[from the above formulas 1 to 4, X represents a substituent selected from oxygen, sulfur, halogen, cyano, cyanate, carbonate, nitrate, nitrite, sulfate, phosphate, thiocyanate, chlorate, perchlorate, tetrafluoro borate, acetylacetonate, carboxylate, and the derivatives thereof; n represents integers of 1 to 4; R1 to R6 are independently selected from hydrogen, $C_1$-$C_{30}$ aliphatic or cycloaliphatic alkyl group or C6-C20 aryl or their mixture of aralkyl group, alkyl and aryl group where functional group is substituted and heterocyclic compound and polymer compound and the derivatives thereof; and R1 and R2 and, independently, R4 and R5 may form a ring by being connected in alkylene independently including heteroatom or not including thereof].

By way of specific example, the compound of the formula 1 includes silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and the derivatives thereof, however, it is not limited thereto.

And, by way of specific example, the substituents R1 to R6 of the compound of the formulas 2 to 4 include hydrogen, methyl, ethyl, propyl, isopropyl, butyl, isobutyl, amyl, hexyl, ethylhexyl, hepyyl, octyl, isooctyl, nonyl, decyl, dodecyl, hexadecyl, oktadecyl, docodecyl, cyclopropyl, cyclopentyl, cyclohexyl, allyl, hydroxy, methoxy, hydroxylethyl, methoxyethyl, 2-hydroxylpropyl, methoxy propyl, cyanoethyl, ethoxy, butoxy, hexyloxy, methoxy ethoxyethyl, methoxyethoxyethoxyethyl, hexamethylene imine, morpholine, piperidine, piperazine, ethylene diamine, propylene diamine, hexamethylene diamine, triethylene diamine, pyrrole, imidazole, pyridine, carboxymethyl, trimethoxy silyl propyl, tri ethoxy silyl propyl, phenyl, methoxy phenyl, cyano phenyl, phenoxy, tolyl, benzyl, and the derivatives thereof, and they can be selected from polymer compound such as polyallylamine and polyethylenimine and the derivatives thereof. However, they are not specifically limited thereto.

By way of specific example as a compound, the ammonium carbamate compound of the formula 2 includes at least one or two mixtures selected from ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethylene imineammonium hexamethylene iminecarbamate, mopholinium morpholinecarbamate, pyridinium ethylhexylcarbamate, triethylene diaminium isopropylbicarbonate, benzylammonium benzylcarbamate, triethoxysilylpropylammonium triethoxy silylpropylcarbamate, and the group consisting of the derivatives thereof. The ammonium carbonate compound of the formula 3 includes at least one or two mixtures selected from ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethyl carbonate, 2-cyanoethylammonium 2-cyanoethyl carbonate, octadecylammonium octadecylcarbonate, dibutylammonium dibutylcarbonate, dioctadecylammonium dioctadecylcarbonate, methyldecylammonium methyldecylcarbonate, hexamethylene imineammonium hexamethylene iminecarbonate, morpholineammonium morpholinecarbonate, benzylammonium benzyl carbonate, triethoxysilylpropylammonium triethoxysilylpropylcarbonate, triethylene diaminium isopropylcarbonate, and the derivatives thereof.

By way of specific example, the ammonium bicarbonate compound of the formula 4 includes at least one or two mixtures selected from ammonium bicarbonate, isopropylammonium isopropylbicarbonate, t-butylammoniumbicarbonate, 2-ethylhexylammonium bicarbonate, 2-methoxyethylammonium bicarbonate, 2-cyanoethylammonium bicarbonate, dioctadecylammonium bicarbonate, and the derivatives thereof.

Meanwhile, there is no need to specifically limit the kinds and the method for preparation of the ammonium carbamate compound, the ammonium carbonate compound or the ammonium bicarbonate compound. For example, U.S. Pat. No. 4,542,214 (Sep. 17, 1985) discloses that ammonium carbamate compound can be prepared from a first amine, a second amine, a third amine or the mixture thereof at least one and carbon dioxide, wherein if water of 0.5 mole is further added per said amine of mole, the ammonium carbonate compound is obtained and if water of 1 mole or more is added, the ammonium bicarbonate compound is obtained. At this itme, they can be prepared without special solvent in a normal pressure state or a pressure state and if solvent is used, they can include alcohols such as water, methanol, ethanol, isopropanol, and butanol, glycols such as ethyleneglycol, glycerin, glycerine, acetates such as ethylacetate, butylacetate, carbitolacetate, ethers such as diethylether, tetrahydrofuran, dioxane, ketones such as methylethylketone, acetone, hydrocarbons such as hexane, heptane, aromatic hydrocarbons such as benzene, toluene, and halogen substitution solvent such as chloroform, methylenechloride, carbontetrachloride, or the mixture solvent thereof, wherein carbon dioxide can be bubbled in a vapor state or use dry ice in a solid state and can be reacted even in a supercritical state. In the present invention, when preparing the derivatives of the ammonium carbamate, the ammonium carbonate or the ammonium bicarbonate, any well-known methods may be used besides the methods as described above, if the structure of the final material is the same. In other words, there is no need to specifically limit the solvent, reaction temperature, density or catalyst, etc. for preparation, including the preparing yield.

An organic silver complex compound can be prepared by reacting the ammonium carbamate compound, the ammonium carbonate compound, or the ammonium bicarbonate compound prepared as described above with silver compound. For example, at least one silver compound as shown in the formula 1 and the compounds as shown in the formulas 2 to 4 or the mixture thereof can directly be reacted without solvent in a normal pressure state or a pressure state in nitrogen atmosphere and if solvent is used, they can include alcohols such as water, methanol, ethanol, isopropanol, and butanol, glycols such as ethyleneglycol, glycerin, glycerine, acetates such as ethylacetate, butylacetate, carbitolacetate, ethers such as diethylether, tetrahydrofuran, dioxane, ketones such as methylethylketone, acetone, hydrocarbons such as hexane, heptane, aromatic hydrocarbons such as benzene, toluene, and halogen substitution solvent such as chloroform, methylenechloride, carbontetrachloride, or the mixture solvent thereof.

In the preparing method according to the present invention, step a) includes, after preparing mixture solution of amine compounds corresponding to the compounds of the formulas 2 to 4 and the silver compound of the formula 1, reacting the corresponding ammonium carbamate or ammonium carbonate compound in the solution by applying carbon dioxide.

As described above, they can directly be reacted without solvent in a normal pressure state or a pressure state in nitrogen atmosphere or can be reacted using solvent. However, any well-known methods may be used, if the structure of the final material is the same. In other words, there is no need to specifically limit the solvent, reaction temperature, density, use or non-use of catalyst, etc. for preparation, including the preparing yield.

The preparing method of the silver complex compound according to the present invention is described in Korean Patent Application No. 2006-0011083 filed by the present inventors and it is recognized in the following formula 5.

$$Ag[A]_m \qquad \text{[Formula 5]}$$

[A is the compounds of the formula 2 to the formula, m is 0.7 to 2.5]

Step b): Preparing the Silver Complex Compound by Reacting the Silver Complex Compound Prepared in the a) Step with the Reducer, or by Reducing or Pyrolyzing the Silver Complex Compound by Applying Heat Thereto.

The step b) is a step preparing the silver nanoparticles by diluting the silver complex compound prepared in the step a) with diluent to have a predetermined density and reacting it with the reducer or reducing or pyrolyzing the silver complex compound by applying heat thereto.

The reducer includes Lewis acid or weak bronsted acid. The reducer adoptable in the method for preparation of the present invention can use at least one of amine compounds such as hydrazine, hydrazinemonohydrate, acethydrazide, sodium or potassium borohydride, dimethylamineborane, and butylamineborane, metal salts such as ferric chloride (I) and iron sulfate, aldehyde compound such as hydrogen, hydrogen iodide, carbon monoxide, formaldehyde, acetaldehyde, and glyoxal, formate compounds such as methyl formate, butyl formate, and triethyl-o-formate, reduction organic compounds such as glucose, ascorbic acid, and hydroquinone, or the mixture thereof. The reducer described above can be used, but is not limited thereto.

If the reducer solution prepared by diluting the reducer with specific solvent reacts with the complex compound by a reactor having an agitator, the silver complex compound is reduced so that the silver complex compound can be prepared.

Also, the size and surface property of the nano particles are changed according to the kind of reducers, a mixing ratio, and a mixing method. Primary nanoparticles reduced are agglomerated and precipitated in a cluster form of nanoparticles when the surface treatment of the nanoparticles is not usually performed. Also, the reduction ability and reduction velocity are changed according to the kind of reducers. Therefore, the preparing yield and particle size of the silver complex compound can be controlled using the difference of the reduction ability.

The diluent in the reduction step can include water, alcohols such as methanol, ethanol, isopropanol, 1-methoxy propanol, butanol, ethylhellsil alcohol, and terpineol, glycols such as ethylene glycol and glycerin, acetates such as ethyl acetate, butyl acetate, methoxy propyl acetate, carbitol acetate, and ethyl carbitol acetate, ethers such as methyl cellosolve, butyl cellosolve, diethyl ether, tetrahydrofuran, and dioxane, ketones such as methylethylketone, acetone, dimethylformamide, and 1-methyl-2-pyrrolidone, hydrocarboneous such as hexane, heptane, dodecane, paraffin oil, and mineral spirit, aromatics such as benzene, toluene, and xylene, halogen substitution solvents such as chloroform, methylenechloride, carbontetrachloride, and solvents such as acetonitrile and dimethylsulfoxide or the mixture thereof, etc., however, it is not limited thereto. The diluents of the reducer and the silver complex compound may be different from each other.

The thermal processing method forming the silver nano particles by reducing or pyrolyzing the silver complex compound by applying heat thereto can be made by means of any known methods, wherein the thermal processing temperature is preferably 40 to 200° C., more preferably 80 to 150° C.

The thermal process and the reduction process can be made in the thermal processing temperature of 40° C. or less or 200° C. or more. However, the reduction processing speed is slow at 40° C. or less and the temperature 200° C. or more is excessively high.

The metal nanoparticles can be prepared by means of the aerosol method or the pyrolysis method using the vapor reaction of metal compound and gas reducer, which is known as the thermal decomposing methods of the silver complex compound.

Also, in order to promote the formation of nanoparticles through the thermal decomposing reaction, the particle size, the agglomerization, and the yield can be effectively controlled by using the pyrolysis reaction promoter.

The effective pyrolysis reaction promoter includes hydroxyalkylamines such as ethanolamine, methylethanolamine, triethanolamine, propanolamine, butanolamine, and hexanolamine, dimethylethanolamine, etc., amine compounds such as piperidine, N-methylpiperidine, piperazine, N,N'-dimethylpiperazine, 1-amino-4 methylpiperazine, pyrrolidine, N-methylpyrrolidine, and morpholine, alkyloximes such as acetoneoxime, dimethylglyoxime, 2-butanonoxime, and 2,3-butadionmonooxime, glycols such as ethyleneglycol, diethylglycol, and triethyleneglycol, alkoxyalkyls such as methoxyethylamine, ethoxyethylamine, and methoxypropylamine, alkoxyalkanols such as methoxyethanol, methoxypropanol, and ethoxyethanol, ketones such as acetone, methylethylketone and methylisobutylketone, ketonealcohols such as acetol and diacetonealcohol, and oxidation polymerizable resin such as polyphenol compound, phenol resin, alkyd resin, pyrrol, and ethylenedioxythiophene (EDOT), etc. More than one pyrolysis reaction promoters can be used together.

As above, the silver complex compound with a special structure can be prepared, the silver nano particles can be prepared by reacting the silver complex compound with the reducer or reducing or pyrolyzing it by applying heat thereto, and the silver nanoparticle whose surface is coated with amine or the foregoing complex compounds in a core-shell structure can be prepared. The silver nano particles can be sintered even at a low temperature and is excellent in dispersity for solvent due to the surface treatment property of such nanoparticles.

Step c): Stabilization-Treating Step for the Improvement of Dispersity and Prevention of Agglomerization of Particles.

The silver complex compound prepared by suffering from the steps a) and b) further includes stabilization-treating applying stabilizer, making it possible to prevent the agglomerization and to improve dispersity of the silver complex compound.

The stabilizer can be composed of amine compounds such as primary amine, secondary amine, or tertiary amine; ammonium carbamate compound, ammonium carbonate compound, and ammonium bicarbonate, or phosphorous compounds such as phosphine or phosphite, sulfide compounds such as thiol or sulfide, or the mixture consisting of at least of thereof. The concrete example of the amine compounds includes methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docodecylamine, cyclopropylamine, cyclopentylamine, cyclohexylamine, allylamine, hydroxylamine, ammonium hydroxide, methoxyamine, 2-ethanolamine, methoxyethylamine, 2-hydroxypropylamine, methoxypropylamine, cyanoethylamine, ethoxyamine, n-buthoxyamine, 2-hexyloxyamine, methoxyethoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrol, imidazol, pyridine, aminoacetate aldehyde dimethyl acetal, 3-aminopropyltrimethoxysilane, 3-aminopropyltriethoxysilane, aniline, anisidine, aminobenzonitrile, benzilamine, and derivatives thereof; and polymer compound such as polyallylamine or polyethyleneimine and derivatives thereof. The concreate example of the ammonium carbamate, carbonate, and bicarbonate compounds includes ammonium carbamate, ammonium carbonate, ammonium bicarbonate, ethylammonium ethylcarbamate, isopropylammonium isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethylene imineammonium hexamethylene iminecarbamate, mopholinium morpholinecarbamate, pyridinium ethylhexylcarbamate, triethylenediaminium isopropylbicarbamate, benzylammonium benzylcarbamate, triethoxysilylpropylammonium triethoxy silylpropylcarbamate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium, 2-ethylhexylcarbonate, 2-ethylhexylammoniumbicarbonate, 2-methoxyethylammonium 2-methoxyethylcarbonate, 2-methoxyethylammoniumbicarbonate, 2-cyanoethylammonium 2-cyanoethylcarbonate, 2-cyanoethylammoniumbicarbonate, octadecylammonium octadecylcarbonate, dibutylammonium dibutylcarbonate, dioctadecylammonium dioctadecylcarbonate, dioctadecylammonium bicarbonate, methyldecylammonium methyldecylcarbonate, hexamethyleneimineammonium hexamethyleneiminecarbonate, morpholineammonium morpholinecarbonate, benzilammonium benzilcarbonate, triethoxysilylpropylammonium triethoxysilylpropylcarbonate, pyridinium bicarbonate, triethylenediaminum isopropylcarbonate, triethylenediaminum bicarbonate, and derivatives thereof, etc. Also, the phosphorous compounds are the phosphorous compounds represented by a general formula $R_3P$, $(RO)_3P$ or $(RO)_3PO$, wherein R represents alkyl group or aryl group having the number of carbons of 1 to 20. The representative phosphorous compound includes tributylphosphine, triphenylphosphine, triethylphosphite, and triphenylphosphite, etc. The example of the sulfide compounds includes butanethiol, n-hexanethiol, diethyl sulfide, tetrahydrothiophene, etc. The use of these stabilizers are not limited if they meet the property of ink.

The process for preparation of the silver complex compound according to the step b) as described above will be described in detail with reference to FIG. 3. However, this is only one preferred example of the process for preparation of the silver complex compound according to the present invention and thus the present invention is not limited thereto.

After preparing first solution by diluting the silver complex compound prepared in the step a) with diluent to have a predetermined density, prepare the diluted reducer as second solution. The preparation of the nanoparticles in the step b) is made in a first reactor 10 comprising two inlets 11 and 12 and an agitator 13 at the lower end thereof and an outlet. After the first solution and the second solution are injected into the first reactor 10 through the first inlet 11 and the second inlet 12, respectively, at a constant speed, these solutions are reacted by means of the first agitator 13 to form the nanoparticles and then disperse them in a stable form and these solutions is moved into a second reactor 17 via a first outlet 15 of the first reactor 10 and a third inlet 15 provided in the second reactor 17 for a post-processing process that is the step c). The diluted stabilizer is dropped through a fourth inlet 16 of the second reactor 17 and at the same time, is agitated by means of a second agitator 18 so that the post-processing process for stabilizing the nanoparticles generated from the first reactor 10 is performed and the stabilized nanoparticles are exhausted through a second outlet 19, making it possible to prepare the silver complex compound that are the resultant product. Also, the first solution can include the stabilizer if necessary.

After the reaction completes, the methods separating the particles include a vacuum dry method, a filtering method after a natural precipitation, a centrifugal method, and an ultrafiltration method, etc., but are not thereto.

The silver nano particles prepared as above can be used in various industrial fields such as electromagnetic wave shield, reflective film forming material, antimicrobial agent, etc., as well as can prepare the ink compositions usable as the conductive ink.

Hereinafter, the ink compositions including the silver complex compound prepared according to the present invention will be described in detail.

The ink compositions of the present invention include the silver complex compound prepared according to the foregoing method. The ink compositions require solvent serving as dispersant dispersing the silver complex compound, wherein the solvent may be the solvent described in the present invention or a known solvent used when generally preparing the silver nanoink.

If necessary, the conductive ink compositions of the present invention may further include additive such as known solvent, stabilizer, dispersant, binder resin, reducer, surfactant, wetting agent, thixotropic agent, or leveling agent, etc.

Also, in the case of the conductive silver compositions, the silver complex compound with the special structure may further include at least one metal conductor or metal precursor.

The metal conductor is not limited. In other words, any known conductors may be used if they meet the object of the present invention. For example, the kind, size, or shape of the metal conductor or the metal precursor is not limited. In order words, the kinds of the conductor include, for example, at least one metal or alloy or alloy oxide thereof selected from a transition metal group such as Ag, Au, Cu, Zn, Ni, Co, Pd, Pt, Ti, V, Mn, Fe, Cr, Zr, Nb, Mo, W, Ru, Cd, Ta, Re, Os, Ir; a metal group such as Al, Ga, Ge, In, Sn, Sb, Pb, Bi; or a metal group of lanthanides such as Sm, Eu or actinides such as Ac, Th. Furthermore, it includes conductive carbon black, graphite, carbon nano tube, and conductive polymer such as polyacetylene, polypyrrol, polyaniline, polythiophene and derivatives thereof, etc.

Also, the metal precursor is not limited. In other words, any metal precursors may be used if they meet the object of the present invention, and in particular, if they have conductivity through an oxidation or reduction process, an infrared ray process, an ultraviolet ray process, an electro beam process, and a laser process, etc., they becomes more preferable. For example, the metal precursor includes organic metal compound or metal salt, etc. Generally, they may be represented by MnX, wherein M represents oxygen, sulfur, halogen, cyano, cyanate, carbonate, nitrate, nitrite, sulfate, phosphate, thiocyanate, chlorate, perchlorate, tetrafluoro borate, acetylacetonate, mercapto, amide, alkoxide, carboxylate, etc. The concrete example includes at least one of carboxylic acids such as gold acetic acid, oxalic acid palladium, silver 2-ethylhexnoate, copper 2-ethylhexanoate, iron stearate, nickel formic acid, zinc citrate; and metal compounds such as silver nitrate, copper cyanide, cobalt carbonate, platinum chloride, chloroaurate, tetrabutoxy titanium, dimethoxyzirconium dichloride, aluminum isopropoxide, tin tetrafluoro borate, vanadium oxide, indium-tin oxide, tantalum methoxide, bismuth acetate, dodecyl mercapto gold, indium acetylacetonate, etc. Furthermore, the shape of the conductor and the metal precursor may take a spherical shape, a linear shape, a flat shape, or the combinational shapes thereof and can be used in various states, such as a particle state including nanoparticles; powder, flake, colloid, hybrid, paste, sol, and solution states; or more than one mixing state selected therefrom, etc.

The size or used amount of the conductor or the metal precursor are not limited if they meet the ink property of the present invention. In other words, the size is 50 micron or less, more preferably 1 nm or more to 25 micron or less when considering the coating after sintering and the used amount should not exceed a predetermined limit so that the sintering temperature is not too high or the problem of the coating process or pattern forming process is not caused. Generally, the used amount is preferably in the range of 1 to 90% of weight ratio with respect the total ink compositions, more preferably 10 to 70%.

According to the present invention, there is the case where the solvent is required in order to control the viscosity of conductive ink or smoothly form the thin film. At this time, as the usable solvents, there are water, alcohols such as methanol, ethanol, isopropanol, 1-methoxy propanol, butanol, ethylhellsil alcohol, and terpineol, glycols such as ethylene glycol and glycerin, acetates such as ethylacetate, butylacetate, methoxypropylacetate, carbitol acetate, and ethylcarbitolacetate, ethers such as methylcellosolve, butylcellosolve, diethylether, tetrahydrofuran, and dioxane, ketones such as methylethylketone, acetone, dimethylformamide, and 1-methyl-2-pyrrolidone, hydrocarboneous such as hexane, heptane, dodecane, paraffin oil, and mineral spirit, aromatics such as benzene, toluene, and xylene, halogen substitution solvents such as chloroform, methylenechloride, carbontetrachloride, and solvents such as acetonitrile and dimethylsulfoxide or the mixture thereof, etc.

Meanwhile, when there is the conductor with a particle shape or a flake shape in the case of the conductive silver ink compositions, the dispersant is required to smoothly disperse it. As the examples, 4000 series from EFKA Co. Disperbyk series from BYK Co., solsperse series from Avecia Co, TEGO Dispers series from Deguessa Co., Disperse-AYD series from Elemantis Co., JONCRYL series from Johnson Polymer Co., etc., can be used. And, the generally usable binder resin includes at least one of acrylic resin such as polyacryliic acid or polyacryliic acid ester, cellulose resin such as ethyl cellulose, cellulose ester, and cellulose nitrate, aliphatic or copolymer polyester resin, vinyl resin such as polyvinylbutyral, polyvinylacetate, and polyvinylpyrrolidone, polyamide resin, polyurethane resin, polyether and urea resin, alkyd resin, silicon resin, fluorine resin, olefin resin such as polyethylene or polystylene, thermoplastic resin such as petroleum and rosin resin, etc., epoxy resin, unsaturation or vinyl polyester resin, diallyl phthalate resin, phenol resin, oxetane resin, oxazine resin, bismaleide resin, modified silicon resin such as silicon epoxy or silicon polyester, thermosetting resin, ultraviolet ray or infrared ray cured acrylic resin with various structures, and ethylene-propylene rubber (EPR), stylene-butadiene rubber (SBR), starch, natural polymer such as gelatin, etc. Also, the organic resin binder as well as inorganic binder such as glass resin or glass frit, or sillane coupling agent such as trimethoxy propyl sillane or vinyl triethoxy sillane, or titan coupling agent, zirconium coupling agent, and aluminum coupling agent can be used.

The surfactant includes anion surfactant such as sodium lauryl sulfate, non-ionic surfactant such as nonyl phenoxypolyethoxyethanol and FSN from Dupont Co., cation surfactant such as laurylbenzilammonium chloride, etc., or amphoteric surfactant such as lauryl betaine, coco betaine.

The stabilizer for the improvement of the agglomerization and dispersity can be composed of amine compounds such as primary amine, secondary amine, or tertiary amine; ammonium carbamate compound, ammonium carbonate compound, and ammonium bicarbonate, or phosphorous compounds such as phosphine or phosphite, sulfide compounds such as thiol or sulfide, or the mixture consisting of at least of thereof. The stabilizer is not limited if it meets the ink property.

The wetting agent or the wetting dispersant includes polyethyleneglycol, Surfynol series from Air Product Co., and TEGO wet series from Deguessa Co., and the thixotropic agent, or leveling agent includes BYK series from BYK Co., glide series from Degussa Co., EFKA 3000 series from EFKA Co., DSX series from Cognis Co., etc. Also, in order to facilitate the sintering, the pyrolsis reaction promoter can be added.

In addition to the methods preparing the conductive ink compositions of the present invention, the silver compound the formula 1, an excessive amount of amine compound, or the ammonium carbamate compound or the ammonium carbonate compound, and the mixed solution thereof are prepared. The conductive ink compositions obtained by adding the conductor or the metal precursor, or at least one mixture thereof, and the dispersant, the binder or the other additive, etc., to the prepared products, if necessary, and then reacting them with carbon dioxide are prepared and used. At this time, the direct reaction can be made without having solvent or with solvent under the normal pressure state or the pressure state.

The silver ink compositions prepared according to the present invention can easily form the thin film or the pattern by means of the coating process or the printing process using the various substrates. For example, the substrate such as metal, glass, silicon wafer, ceramic, plastic film such as polyester or polyimide, rubber sheet, fiber, wood, paper, etc., can be coated to prepare the thin film or can be directly printed. The substrate is used after washing or fat removal or can be specially used by means of a pre-processing method. The pre-process method includes plasma, ion beam, corona, oxidation or reduction, heating, etching, ultraviolet irradiation, and primer processing using the binder or the additives, etc.

As the thin film preparing method or the printing method, any one of a spin coating, a roll coating, a spray coating, dip coating, a flow coating, a doctor blade and dispensing, an ink jet printing, an offset printing, a screen printing, a pad printing, a gravure printing, a flexography printing, a stencil printing, an imprinting, a xerography, a lithography, etc., can be selected and used according to the physical properties of ink.

The viscosity of the present invention is not limited. In other words, any viscosity can be selected if the problem of the thin film preparing method and the printing method is not caused. The viscosity may de different according the method and the kind, however, it is preferably in the range of 1 mpa·s to 1000 pa·s, more preferably, 5 mpa·s to 500 mpa·s.

The thin film or the pattern obtained according to the above methods can be used to form the metal or the metal oxide pattern through the post-processing process such as the oxidation or the reduction process or thermal treatment, the infrared ray process, the ultraviolet ray process, the electro beam process, and a laser process. The post-processing process can perform the thermal treatment under a usual inert atmosphere, however, if necessary, perform the thermal treatment under air, nitrogen, carbon monoxide or the mixed gas of hydrogen and air or other inert gases. The thermal treatment is made in the range of 80 to 400° C., preferably, 90 to 300° C., and more preferably, 100 to 250° C. in order to improve the physical properties of the thin film. In addition, the heating treatment of more than two steps of a low temperature and a high temperature within the range is advantageous in improving the uniformity of the thin film. For example, the treatment is preferably made at 80 to 150° C. for 1 to 30 minutes and 150 to 300° C. for 1 to 30 minutes.

DESCRIPTION OF DRAWINGS

FIG. 1 is an SEM photograph of silver complex compound prepared according to an example 5 of the present invention;

FIG. 2 is an SEM photograph of silver complex compound prepared according to an example 6 of the present invention;

FIG. 3 is an SEM photograph of silver complex compound prepared according to an example 10 of the present invention;

FIG. 4 is a concept view showing one example of a process for preparation of silver complex compound of the present invention; and FIG. 5 is a view showing a PET film printed using a screen printer of the example 11 of the present invention.

DETAILED DESCRIPTION OF MAIN ELEMENTS

| | |
|---|---|
| 10: FIRST REACTOR | 11: FIRST INLET |
| 12: SECOND INLET | 13: FIRST AGITATOR |
| 14: FIRST OUTLET | 15: THIRD OUTLET |
| 16: FOURTH INLET | 17: SECOND REACTOR |
| 18; SECOND AGITATOR | 19: SECOND OUTLET |

MODE FOR INVENTION

Hereinafter, the examples of the present invention will be described in detail. The examples are only the illustration of the present invention and thus the scope of the present invention is not limited thereto.

Example 1

Viscous liquid of 34.89 gram (129.8 milimole), which is a mixture of 2-ethylhexylammonium 2-ethylhexylcarbamate and butylammonium butylcarbamate with a mole ratio of 7:3, and silver oxide of 12.03 gram (51.92 millimole) are input in a schlenk flask of 250 milliliter attached with an agitator and reacted, being agitated for two hours at a room temperature. As the reaction is progressed, complex compound is generated in black slurry in the beginning so that the color becomes thin to finally obtain yellow transparent liquid silver complex compound of 46.92 gram having viscosity of 7.8 pa·s, wherein the silver content is 23.65 wt % as a result of thermal analysis (TGA).

Example 2

The first solution is prepared by adding the silver complex compound of 40.0 gram prepared in the Example 1 and isopropyl alcohol of 23.1 gram in a beaker of 100 milliliter and agitating them for ten minutes at a room temperature. And, the second solution is prepared by adding hydrazinemonohydrate of 1.2 gram and isopropyl alcohol of 50 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green.

Example 3

The first solution is prepared by adding the silver complex compound of 40.0 gram prepared in the Example 1 and isopropyl alcohol of 23.1 gram in a beaker of 100 milliliter and agitating them for ten minutes at temperature of 40° C. And, the second solution is prepared by adding acetol of 30. gram <prepared by Aldrich Co.> and isopropyl alcohol of 48.5 gram in another beaker of 100 milliliter. The first solution and the second solution are heated at temperature of 50° C. and then injected to each inlet at a flux speed of 10 g/min. The solution injected through the inlet is reacted at a speed of 5,000 rpm using an agitator <prepared by Silverthorne Co., Product name: L4RT-A> to obtain slurry of thick red-green. The reaction filtrate of the prepared slurry is removed by using a centrifuge <prepared by Hanil Science Industrial Co., Ltd.> and then is washed using isopropyl alcohol three times, making it possible to obtain nano powder of green.

Example 4

The first solution is prepared by adding the silver complex compound of 40.0 gram prepared in the Example 1 and isopropyl alcohol of 23.1 gram in a beaker of 100 milliliter and agitating them for ten minutes at a room temperature. And, the second solution is prepared by adding borane-dimethyl amine of 1.41 gram <prepared by Aldrich Co.> and 1-butanol of 49.77 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green.

Example 5

The first solution is prepared by adding the silver complex compound of 40.0 gram prepared in the Example 1 and isopropyl alcohol of 23.1 gram in a beaker of 100 milliliter and agitating them for ten minutes at temperature of 40. And, the second solution is prepared by adding methylformate of 4.79 gram <prepared by Aldrich Co.> and 1-butanol of 47.1 gram in another beaker of 100 milliliter. The first solution and the second solution are injected to each inlet at a flux speed of 10 g/min. The solution injected through the inlet is reacted at a speed of 5,500 rpm using an agitator to obtain slurry of thick green.

The prepared slurry is naturally precipitated to be filtered using a 1.2 um filter <prepared by Wattman Co., Product name: GF/C> and then is washed using isopropyl alcohol three times, making it possible to obtain nano powder of green. The SEM photograph thereof is shown in FIG. 1.

Example 6

The first solution is prepared by adding the silver complex compound of 40.0 gram prepared in the Example 1, isobutylamine of 8.6 gram <prepared by Aldrich Co.>, and isopropyl alcohol of 13.91 gram in a beaker of 100 milliliter and agitating them for ten minutes at a room temperature. And, the second solution is prepared by adding hydrazinemonohydrate of 1.2 gram <prepared by Daejungchem Co.> and isopropyl alcohol of 50 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green. The SEM photograph thereof is shown in FIG. 2.

Example 7

The first solution is prepared by adding the silver complex compound of 40.0 gram prepared in the Example 1, diethanolamine of 8.6 gram <prepared by Aldrich Co.>, and isopropyl alcohol of 27.46 gram in a beaker of 100 milliliter and agitating them for ten minutes at a room temperature. And, the second solution is prepared by adding hydrazinemonohydrate of 1.2 gram <prepared by Daejungchem Co.> and isopropyl alcohol of 50 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green.

Example 8

The first solution is prepared by adding the silver complex compound of 40.0 gram prepared in the Example 1 and isopropyl alcohol of 23.1 gram in a beaker of 100 milliliter and agitating them for ten minutes at a room temperature. And, the second solution is prepared by adding hydrazinemonohydrate of 1.2 gram <prepared by Daejungchem Co.> and isopropyl alcohol of 50 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green, wherein 1-octanediol of 0.26 gram <prepared by TCI Co., Ltd.> diluted with isopropyl alcohol of 2.6 gram is slowly added to perform a surface treatment. The reaction filtrate of the prepared slurry is removed by using a centrifuge <prepared by Hanil Science Industrial Co., Ltd.> and then is washed usig isopropyl alcohol three times, making it possible to obtain nano powder of green.

Example 9

The first solution is prepared by adding the silver complex compound of 40.0 gram prepared in the Example 1 and hexane of 23.1 gram in a beaker of 100 milliliter and agitating them for ten minutes at a room temperature. And, the second solution is prepared by adding hydrazinemonohydrate of 1.2 gram <prepared by Daejungchem Co.> and methanol of 54.5 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green.

Example 10

The silver complex compound of 40.0 gram prepared in the Example 1,1-pentanol of 10 gram <prepared by Aldrich Co.>, and isobutylamine of 8.6 gram <prepared by Aldrich Co.> are added in a schlenk flask of 250 milliliter attached with an agitator to be raised to the temperature of 115° C. and reacted, being agitated for six hours. After completing the pyrolytic reaction, dark red slurry is cooled at a room temperature to be filtered using a 1.2 um filter <prepared by Wattman Co., Product name: GF/C> and then is washed using isopropyl alcohol three times, making it possible to obtain nano powder of brown. The SEM photograph thereof is shown in FIG. 3. Therefrom, it can be appreciated that particles having various shapes or sizes are generated.

Example 11

The silver complex compound of 100 gram prepared in the Example 1,1-pentanol of 21.8 gram <prepared by Aldrich Co.>, and isobutylamine of 21.5 gram <prepared by Aldrich Co.> are added in a schlenk flask of 250 milliliter attached with a dean-stark apparatus an agitator. And, they are raised to the temperature of 115° C. to simultaneously perform a pyrolytic reaction and removal of a min or a low-boiling complex compound, being agitated for six hours. After completing the reaction, dark red slurry is cooled at a room temperature to be filtered using a 1.2 um filter <prepared by Wattman Co., Product name: GF/C> and then is washed using isopropyl alcohol three times, making it possible to obtain nano powder of brown.

Example 12

The silver complex compound of 100 gram prepared in the Example 1 and toluene of 43.34<prepared by Aldrich Co.> are added in a high pressure reactor <prepared by Hanwoul Engineering Inc., Product name: HR-8302>. And, they are raised to the temperature of 130° C. and agitated for six hours. After completing the high pressure pyrolytic reaction, dark red slurry is cooled at a room temperature to be filtered using a 1.2 um filter <prepared by Wattman Co., Product name: GF/C> and then is washed using isopropyl alcohol three times, making it possible to obtain nano powder of brown.

Example 13

The silver complex compound of 100 gram prepared in the Example 1,1-pentanol of 30.97 gram <prepared by Aldrich Co.>, and ethylene glycol of 12.37 gram <prepared by Aldrich Co.> are added in a schlenk flask of 250 milliliter attached with an agitator to be raised to the temperature of 115 and reacted, being agitated for six hours. After completing the pyrolytic reaction, dark red slurry is cooled at a room temperature to be filtered using a 1.2 um filter <prepared by Wattman Co., Product name: GF/C> and then is washed using isopropyl alcohol three times, making it possible to obtain nano powder of brown.

Example 14

The silver complex compound of 100 gram prepared in the Example 1,1-pentanol of 43.17 gram <prepared by Aldrich Co.>, and glucose of 35.83 gram <prepared by Aldrich Co.> are dissolved with distilled water of 36 gram to be added in a schlenk flask of 250 milliliter attached with an agitator. And, they are raised to the temperature of 115° and reacted, being agitated for six hours. After completing the pyrolytic reaction, dark red slurry is cooled at a room temperature to be filtered using a 1.2 um filter <prepared by Wattman Co., Product name: GF/C> and then is washed using isopropyl alcohol three times, making it possible to obtain nano powder of brown.

Example 15

The viscous liquid of 33.37 gram (104.2 millimole), which is 2-ethylhexylammonium 2-ethylhexylcarbonate, and silver oxide of 9.66 gram (41.7 milimole) <prepared by Aldrich Co.> are added in a schlenk flask of 250 milliliter attached with an agitator and reacted, being agitated for two hours at a room temperature. As the reaction is progressed, complex compound is generated in black slurry in the beginning so that the color becomes thin to finally obtain yellow transparent liquid silver complex compound of 43.03 gram having viscosity of 7.8 pa·s, wherein the silver content is 20.9 wt % as a result of thermal analysis (TGA). The first solution is prepared by adding the silver complex compound of 40.0 gram and isopropyl alcohol of 23.1 gram in a beaker of 100 milliliter and agitating them for ten minutes at a room temperature. And, the second solution is prepared by adding hydrazinemonohydrate of 1.2 gram <prepared by Daejungchem Co.> and isopropyl alcohol of 50 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green.

Example 16

The viscous liquid of 33.37 gram (174.2 millimole), which is 2-ethylhexylammonium 2-ethylhexylbicarbonate, and silver oxide of 16.15 gram (69.68 millimole) <prepared by Aldrich Co.> are added in a schlenk flask of 250 milliliter attached with an agitator and reacted, being agitated for two hours at a room temperature. As the reaction is progressed, complex coupound is generated in black slurry in the beginning so that the color becomes thin to finally obtain yellow transparent liquid silver complex compound of 49.52 gram having viscosity of 8.1 pa·s, wherein the silver content is 30.36 wt % as a result of thermal analysis (TGA). The first solution is prepared by adding the silver complex compound of 40.0 gram and isopropyl alcohol of 23.1 gram in a beaker of 100 milliliter and agitating them for ten minutes at a room temperature. And, the second solution is prepared by adding hydrazinemonohydrate of 1.2 gram <prepared by Daejungchem Co.> and isopropyl alcohol of 50 gram in another beaker of 100 milliliter. The first solution and the second solution are injected to each inlet at a flux speed of 20 g/min. The solution injected through the inlet is reacted at a speed of 5,000 rpm using an agitator <prepared by Silverthorne Co., Product name: L4RT-A> to obtain slurry of thick green. The prepared slurry is naturally precipitated to be filtered using a 1.2 um filter <prepared by Wattman Co., Product name: GF/C> and then is washed using isopropyl alcohol three times, making it possible to obtain nano powder of green.

Example 17

After the silver complex compound of 40.0 gram prepared by the same method as the example 1 and the green nano powder of 40 gram prepared by the same method as the example 3, which is added with terpineol of 1.2 gram <prepared by TCI CO.> as heavy solvent, are agitated for 10 minutes, the silver complex compound and the green nano powder, which is added with 1-amino-2-propanol of 1.2 gram <prepared by Aldrich Co.>, is agitated again for 10 minutes. Thereafter, they passes through a three roll-mill <prepared by Drais Mannheim Co> three times so that the conductive ink compositions, which is the silver content of 55.93 wt % and the viscosity of 6.4 pa·s, are prepared. The uniform and densed thin film obtained after applying the prepared ink compositions to the PET film using a silkscreen printer is fired at the temperature described in the following table 1. Thereafter, the results of the measured sheet resistance, specific resistance, and cohesion thereof are represented in the table 1.

Comparative Example 1

Silver flake of 50.2 gram <prepared by Kemet Co., product name: EA02950>, which is added in transparent solution of butylcarbitol of 31.9 gram where polyvinylbutyral of 1.5 gram <prepared by Barker Co. product name: BS-18> as the binder is dissolved, is agitated for 10 minutes. Thereafter, it passes through a three roll-mill <prepared by Drais Mannheim Co> three times so that the conductive ink compositions, which is the silver content of 60.2 wt % and the viscosity of 6.21 pa·s, are prepared.

The uniform and densed thin film obtained after applying the ink compositions prepared by the comparative 1 under the same conditions as the example 17 is fired at the temperature described in the following table 1. Thereafter, the results of the measured sheet resistance, specific resistance, and cohesion thereof are represented in the table 1. The result indicates that the conductivity is relatively low, the cohesion is inferior, and the portion of crack in the compactness is generated, etc.

Example 18

The conductive ink compositions, which are the silver content of 60.5 wt % and the viscosity of 9.0 pa·s, are prepared through the same method as the example 17 using the silver complex compound of 40.0 gram prepared by the same method as the example 1 and the green nano powder of 40 gram prepared by the same method as the example 3. The uniform and densed thin film obtained after applying the prepared ink compositions under the same conditions as the example 17 is fired. Thereafter, the results of the measured sheet resistance, specific resistance, and cohesion thereof are represented in the table 1.

Example 19

The conductive ink compositions, which are the silver content of 60.4 wt % and the viscosity of 7.6 pa·s, are prepared through the same method as the example 17 using the silver complex compound of 40.0 gram prepared by the same method as the example 1 and the green nano powder of 40 gram prepared by the same method as the example 4. The uniform and densed thin film obtained after applying the prepared ink compositions under the same conditions as the example 17 is fired. Thereafter, the results of the measured sheet resistance, specific resistance, and cohesion thereof are represented in the table 1.

Example 20

The conductive ink compositions, which are the silver content of 59.1 wt % and the viscosity of 7.65 pa·s, are prepared through the same method as the example 17 using the silver complex compound of 40.0 gram prepared by the same method as the example 1 and the green nano powder of 40 gram prepared by the same method as the example 6. The uniform and densed thin film obtained after applying the prepared ink compositions under the same conditions as the example 17 is fired. Thereafter, the results of the measured sheet resistance, specific resistance, and cohesion thereof are represented in the table 1.

Example 21

The conductive ink compositions, which are the silver content of 59.8 wt % and the viscosity of 6.3 pa·s, are prepared through the same method as the example 17 using the silver complex compound of 40.0 gram prepared by the same method as the example 1 and the green nano powder of 40 gram prepared by the same method as the example 7. The uniform and densed thin film obtained after applying the prepared ink compositions under the same conditions as the example 17 is fired. Thereafter, the results of the measured sheet resistance, specific resistance, and cohesion thereof are represented in the table 1.

Example 22

The conductive ink compositions, which are the silver content of 61.1 wt % and the viscosity of 6.3 pa·s, are prepared through the same method as the example 17 using the silver complex compound of 40.0 gram prepared by the same method as the example 1 and the green nano powder of 40 gram prepared by the same method as the example 8. The uniform and densed thin film obtained after applying the prepared ink compositions under the same conditions as the example 17 is fired. Thereafter, the results of the measured sheet resistance, specific resistance, and cohesion thereof are represented in the table 1.

Example 23

The green nano powder of 40 gram prepared by the same method as the example 6, which is added in transparent solution of butylcarbitol of 25.5 gram where polyvinylbutyral of 1.2 gram <prepared by Barker Co. product name: BS-18> as the binder is dissolved, is agitated for 10 minutes. Thereafter, it passes through a three roll-mill<prepared by Drais Mannheim Co> three times so that the conductive ink compositions, which is the silver content of 59.9 wt % and the viscosity of 7.8 pa·s, are prepared. The uniform and densed thin film obtained after applying the prepared ink compositions under the same conditions as the example 17 is fired. Thereafter, the results of the measured sheet resistance, specific resistance, and cohesion thereof are represented in the table 1.

Example 24

The conductive ink compositions, which are the silver content of 59.2 wt % and the viscosity of 5.8 pa·s, are prepared through the same method as the example 17 using the silver complex compound of 40.0 gram prepared by the same method as the example 1, the green nano powder of 20 gram prepared by the example 6, and silver flake of 20 gram <prepared by Kemet Co., product name: EA02950>. The uniform and densed thin film obtained after applying the prepared ink compositions under the same conditions as the example 17 is fired. Thereafter, the results of the measured sheet resistance, specific resistance, and cohesion thereof are represented in the table 1.

Example 25

The conductive ink compositions, which are the metal content of 60.1 wt % and the viscosity of 7.9 pa·s, are prepared through the same method as the example 17 using the silver complex compound of 40.0 gram prepared by the same method as the example 1, the green nano powder of 40 gram prepared by the same method as the example 6, and the copper flake <prepared by Changsung Co. product name: TSC-20F) of 20 gram. The uniform and densed thin film obtained after applying the prepared ink compositions under the same conditions as the example 17 is fired. Thereafter, the results of the measured sheet resistance, specific resistance, and cohesion thereof are represented in the table 1.

Example 26

The conductive ink compositions, which are the silver content of 59.3 wt % and the viscosity of 7.4 pa·s, are prepared through the same method as the example 17 using the silver complex compound of 40.0 gram prepared by the same method as the example 1 and the brown nano powder of 40 gram prepared by the same method as the example 10. The uniform and densed thin film obtained after applying the prepared ink compositions under the same conditions as the example 17 is fired. Thereafter, the results of the measured sheet resistance, specific resistance, and cohesion thereof are represented in the table 1.

Example 27

The conductive ink compositions, which are the silver content of 59.2 wt % and the viscosity of 6.3 pa·s, are prepared through the same method as the example 17 using the silver complex compound of 40.0 gram prepared by the same method as the example 1, the nano powder of 40 gram prepared by the same method as the example 2, and the polyvinylpyrrolidone of 1.2 gram <prepared by ISP Co., product name: PVP K-15>. The uniform and densed thin film obtained after applying the prepared ink compositions under the same conditions as the example 17 is fired. Thereafter, the results of the measured sheet resistance, specific resistance, and cohesion thereof are represented in the table 1.

Example 28

The nano powder of 40 gram prepared by the same method as the example 2, which is added with terpineol of 26.9 gram <prepared by TCI Co.>, is agitated for 10 minutes. Thereafter, they passes through a three roll-mill <prepared by Drais Mannheim Co> three times so that the conductive ink compositions, which is the silver content of 59.8 wt % and the viscosity of 8.1 pa·s, are prepared. The uniform and densed thin film obtained after applying the prepared ink compositions under the same conditions as the example 17 is fired. Thereafter, the results of the measured sheet resistance, specific resistance, and cohesion thereof are represented in the table 1.

Example 29

The nano powder of 40 gram prepared by the same method as the example 2, which is added with 2-ethylhexylammonium 2-ethylhexylcarbonate of 10 gram, and terpineol of 16.67 gram <prepared by TCI Co., is agitated for 10 minutes. Thereafter, they passes through a three roll-mill <prepared by Drais Mannheim Co> three times so that the conductive ink compositions, which is the silver content of 59.7 wt % and the viscosity of 5.9 pa·s, are prepared. The uniform and densed thin film obtained after applying the prepared ink compositions under the same conditions as the example 17 is fired. Thereafter, the results of the measured sheet resistance, specific resistance, and cohesion thereof are represented in the table 1.

TABLE 1

Physical property data of silver coating prepared by the examples and the comparative examples

| | Firing Temperature (° C.) | Sheet Resistance ($\Omega/\square$) | Specific Resistance ($\Omega$cm) | Adhesion |
|---|---|---|---|---|
| Example 17 | 140 | 0.072 | $7.2 \times 10^{-6}$ | ○ |
| Example 18 | 140 | 0.078 | $7.95 \times 10^{-6}$ | ○ |
| Example 19 | 140 | 0.124 | $1.22 \times 10^{-5}$ | ○ |
| Example 20 | 140 | 0.059 | $6.3 \times 10^{-6}$ | ○ |
| Example 21 | 140 | 0.206 | $2.1 \times 10^{-5}$ | ○ |
| Example 22 | 140 | 0.124 | $1.3 \times 10^{-5}$ | ○ |
| Example 23 | 140 | 0.079 | $7.8 \times 10^{-6}$ | ○ |
| Example 24 | 140 | 0.074 | $7.5 \times 10^{-6}$ | Δ |
| Example 25 | 140 | 0.094 | $9.4 \times 10^{-6}$ | Δ |
| Example 26 | 140 | 0.069 | $7.1 \times 10^{-6}$ | Δ |
| Example 27 | 140 | 0.078 | $7.8 \times 10^{-6}$ | ○ |
| Example 28 | 120 | 0.150 | $1.5 \times 10^{-5}$ | ○ |
| Example 29 | 140 | 0.073 | $7.3 \times 10^{-6}$ | ○ |
| Comparative Example 1 | 140 | 1.106 | $1.1 \times 10^{-4}$ | X |

(firing means sintering)

(1) Adhesion evaluation: evaluating the state where the silver thin film is transferred on the adhesive surface by attaching a scotch tape (trade name: prepared by 3M Co., trade name: Scotch) to a printed surface and then peeling it.

○: the case where the silver thin film is not transferred to the adhesive surface of the tape.

Δ: the case where a portion of the silver thin film is transferred to the adhesive surface of the tape to be separated from the base.

X: the case where most of the silver thin film is transferred to the adhesive surface of the tape to be separated from the base.

(2) Conductivity evaluation: preparing a rectangle sample of pattern 1 cm×3 cm and measuring it by AIT CMT-SR1000N.

INDUSTRIAL APPLICABILITY

With the preparing method according to the present invention, the selectivity of the size of the particles and the preparation of particles with various sizes through a simple preparation process can be improved and the silver ink including the prepared silver nano particles can provide the silver ink compositions capable of being fired even when it is fired at a low temperature of 150° C. or less during a short time.

Also, with the present invention, the silver ink compositions are easily fired even at a low temperature during a short time so that the coating or pattern having the high conductivity can be formed, and the silver ink compositions capable of applying various coating methods to various substrate such as metal, glass, silicon wafer, ceramic, plastic film such as polyester or polyimide, rubber sheet, fiber, wood, paper, etc., can be provided.

Also, when using the compositions according to the present invention, the coating is formed to be uniform and the conductivity and adhesion of the formed coating is excellent, and since the crack of the coating is not generated, the physical properties and the quality are remarkably improved.

Also, the excellent conductive ink compositions usable for an electrode or a wiring material in fields such as a conductive adhesive, a low resistance metal wiring, a printed circuit board (PCB), a flexible printed circuit board (FPC), an antenna for a radio frequency identification (RFID) tag, a solar battery, a secondary battery or a fuel cell, a plasma display panel (PDP), a thin film transistor liquid crystal display (TFT-LCD), an organic light emitting diode (OLED), a flexible display, and an organic thin film transistor (OTFT), etc., by using the conductive ink of the present invention can be provided.

Also, the present invention can provide the ink compositions capable of being applied to the reflective film, the electromagnetic wave shield, and the antimicrobial agent, etc.

The invention claimed is:

1. A method for preparation of silver nanoparticles comprising the steps of:
   a) preparing a silver complex compound by reacting the silver compound represented by the following formula 1 with at least one or two mixtures selected from ammonium carbamate compound, ammonium carbonate compound or ammonium bicarbonate compound represented by the following formulas 2 to 4; and
   b) preparing the silver nanoparticles by reacting the silver complex compound prepared in the a) step with a reducer, or by reducing or pyrolyzing the silver complex compound by applying heat thereto, $Ag_nX$ [Formula 1]

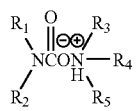
[Formula 2]

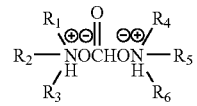
[Formula 3]

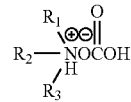
[Formula 4]

from the above formulas 1 to 4, X represents a substituent selected from oxygen, sulfur, halogen, cyano, cyanate, carbonate, nitrate, nitrite, sulfate, phosphate, thiocyanate, chlorate, perchlorate, tetrafluoro borate, acetylacetonate, carboxylate, and the derivatives thereof; n represents integers of 1 to 4; R1 to R6 are independently hydrogen, $C_1$-$C_{30}$ aliphatic or cycloaliphatic alkyl group or C6-C20 aryl or their mixture of aralkyl group, alkyl and aryl group where functional group is substituted and heterocyclic compound and polymer compound and the derivatives thereof; and $R_1$ and $R_2$ and, independently, $R_4$ and $R_5$ may form a ring by being connected in alkylene independently including heteroatom or not including thereof, with a proviso that not all of $R_1$ through $R_6$ are hydrogen.

2. The method as set forth in claim 1, wherein the compound prepared in the step a) is the silver complex compound of the following formula 5, $Ag[A]_m$ [Formula 5]

A is the compounds of the formula 2 to the formula 4 described in the claim 1, m is 0.7 to 2.5.

3. The method as set forth in claim 1, wherein the silver compound of the formula 1 is at least one or two mixture selected from silver oxide, silver thiocyanate, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and the derivatives thereof.

4. The method as set forth in claim 1, wherein the substituents R1 to R6 of the compound of the formulas 2 to 4 are independently selected from hydrogen, methyl, ethyl, propyl, isopropyl, butyl, isobutyl, amyl, hexyl, ethylhexyl, hepyyl, octyl, isooctyl, nonyl, decyl, dodecyl, hexadecyl, oktadecyl, docodecyl, cyclopropyl, cyclopentyl, cyclohexyl, allyl, hydroxy, methoxy, methoxyethyl, methoxy propyl, cyanoethyl, ethoxy, butoxy, hexyloxy, methoxy ethoxyethyl, methoxyethoxyethoxyethyl, hexamethylene imine, morpholine, piperidine, piperazine, ethylene diamine, propylene diamine, hexamethylene diamine, triethylene diamine, pyrrole, imidazole, pyridine, carboxymethyl, trimethoxy silyl propyl, tri ethoxy silyl propyl, phenyl, methoxy phenyl, cyano phenyl, phenoxy, tolyl, benzyl, polyallylamine, polyethyleneamine and the derivatives thereof, with a proviso that not all of $R_1$ through $R_6$ are hydrogen.

5. The method as set forth in claim 1, wherein the ammonium carbamate compounds of the formula 2 are at least one or two mixtures selected from ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethylene imineammonium hexamethylene iminecarbamate, morpholinium morpholinecarbamate, pyridinium ethylhexylcarbamate, triethylene diaminium isopropylbicarbonate, benzylammonium benzylcarbamate, triethoxysilylpropylammonium triethoxy silylpropylcarbamate, and the derivatives thereof; the ammonium carbonate compounds of the formula 3 are at least one or two mixtures selected from ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethyl carbonate, 2-cyanoethylammonium 2-cyanoethyl carbonate, octadecylammonium octadecylcarbonate, dibutylammonium dibutylcarbonate, dioctadecylammonium dioctadecylcarbonate, methyldecylammonium methyldecylcarbonate, hexamethylene imineammonium hexamethylene iminecarbonate, morpholineammonium morpholinecarbonate, benzylammonium benzyl carbonate, triethoxysilylpropylammonium triethoxysilylpropylcarbonate, triethylene diaminium isopropylcarbonate, and the derivatives thereof; and the ammonium bicarbonate compounds of the formula 4 are at least one or two mixtures selected from isopropylammonium isopropylbicarbonate, t-butylammoniumbicarbonate, 2-ethylhexylammonium bicarbonate, 2-methoxyethylammonium bicarbonate, 2-cyanoethylammonium bicarbonate, dioctadecylammonium bicarbonate, and the derivatives thereof.

6. The method as set forth in claim 1, wherein
the step a) comprises preparing by reacting the silver compound of the formula 1 with amine compounds corresponding to the compounds of the formulas 2 to 4 in the solution by applying carbon dioxide, after preparing mixture solution of amine compounds corresponding to the compounds of the formulas 2 to 4 and the silver compound of the formula 1.

7. The method as set forth in claim 1, wherein the reducer applied in the step b) is selected from at least one selected from amine compounds consisting of hydrazine, acethydrazide, sodium or potassium borohydride, dimethylaminoborane, and butylamineborane, metal salts selected from ferric chloride (I) and iron sulfate, aldehyde compound selected from hydrogen, hydrogen iodide, carbon monoxide, formaldehyde, acetaldehyde, and glyoxal, formate compounds selected from methyl formate, butyl formate, and triethyl-o-formate, reduction organic compounds selected from glucose, ascorbic acid, and hydroquinone.

8. The method as set forth in claim 1, wherein the heating temperature in the step b) is 40 to 200° C.

9. The method as set forth in claim 1, further including pyrolysis reaction promoter in the step b).

10. The method as set forth in claim 9, wherein the pyrolysis reaction promoter includes at least one or two mixtures selected from amine compounds, alkyloxime compounds, glycol compounds, alkoxyalkanol compounds, ketone compounds, ketonealcohol compounds, and oxidation polymerizable resin.

11. The method as set forth in claim 10, wherein the amine compounds are ethanolamine, methyldiethanolamine, triethanolamine, propanolamine, butanolamine, hexanolamine, dimethylethanolamine, methoxyethylamine, ethoxyethylamine, methoxypropylamine, piperidine, N-methylpiperidine, piperazine, N,N'-dimethylpiperazine, 1-amino-4methylpiperidine, pyrrolidine, N-methylpyrrolidine, and morpholine, the alkyloxime compounds are acetonoxime, dimethylglyoxime, 2-butanonoxime, and 2,3-butadionmonooxime, the glycol compounds include ethyleneglycol, diethylglycol, and triethyleneglycol, the alkoxyalkanol compounds are methoxyethanol, methoxypropanol, and ethoxyethanol, the ketone compounds are acetone, methylethylketone, and methylisobutylketone, the ketonealcohol compounds include acetol and diacetonalcohol, and the oxidation polymerization resin are polyphenol compound, phenol resin, alkyd resin, pyrrol, and ethylenedioxythiophene (EDOT).

12. The method as set forth in claim 1, further includes applying stabilizer in order to improve the agglomeration and dispersity of the particles after the step b).

13. The method as set forth in claim 12, wherein the stabilizer is at least one selected from amine compounds consisting of primary amine, secondary amine, or tertiary amine; ammonium carbamate compound of the following formula 2, ammonium carbonate compound of the following formula 3, and ammonium bicarbonate of the following formula 4, phosphorous compounds, or sulfide compounds

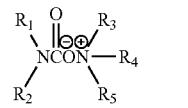
[Formula 2]

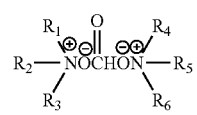
[Formula 3]

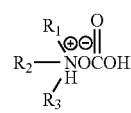
[Formula 4]

in the formulas, $R_1$ to $R_6$ are substituents independently selected from hydrogen, $C_1$-$C_{30}$ aliphatic or cycloaliphatic alkyl group or aryl or aralkyl group, which is the mixture thereof, alkyl and aryl group where functional group is substituted and heterocyclic compound and polymer compound and the derivatives thereof; and $R_1$ and $R_2$ and, independently, $R_4$ and $R_5$ may form a ring by being connected in alkylene independently including heteroatom or not including thereof, with a proviso that not all of $R_1$ through $R_6$ are hydrogen.

14. The method as set forth in claim 13, wherein the phosphorus compounds are selected from the compounds represented by the following chemical 6, the following formula 7, or the following formula 8

 $R_3P$ [Formula 6]

 $(RO)_3P$ [Formula 7]

 $(RO)_3PO$ [Formula 8]

R is substituent selected from alkyl group or aryl group having the number of carbons of 1 to 20.

15. The method as set forth in claim 13, wherein the sulfur compounds is selected from butanethiol, n-hexanethiol, diethyl sulfide, and tetrahydrothiophene.

16. Silver nanoparticles prepared by a method according to claim 1.

17. Ink compositions including the silver nanoparticles prepared by a method according to claim 1.

18. The ink compositions as set forth in claim 17, wherein the silver ink compositions include conductor, metal precursor, or at least one mixture thereof.

19. The ink compositions as set forth in claim 18, wherein the used amount of the conductor or the metal precursor or the mixture thereof is 1 to 90 wt % for the ink compositions.

20. The ink compositions as set forth in claim 18, wherein the conductor includes at least any one component selected from a group consisting of Ag, Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac, Th and at least one metal thereof or alloy thereof or alloy oxide thereof, conductive carbon black, graphite, carbon nano tube, and conductive polymer.

21. The ink compositions as set forth in claim 18, wherein the metal precursor is selected from at least one metal compound of the following formula 5

MnX [Formula 5]

where M is Ag, Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac, Th, n is an integer of 1 to 10, X is substituent selected from oxygen, sulfur, halogen, cyano, cyanate, carbonate, nitrate, nitrite, sulfate, phosphate, thiocyanate, chlorate, perchlorate, tetrafluoro borate, acetylacetonate, mercapto, amide, alkoxide, carboxylate, and derivatives thereof.

22. The ink compositions as set forth in claim 21, wherein the metal precursor includes at least any one selected from a group consisting of gold acetic acid, oxalic acid palladium, silver 2-ethylhexnoate, copper 2-ethylhexanoate, iron stearate, nickel formic acid, zinc citrate, bismuth acetate, silver nitrate, copper cyanide, cobalt carbonate, platinum chloride, chloroaurate, tetrabutoxy titanium, dimethoxyzirconium dichloride, aluminum isopropoxide, tin tetrafluoro borate, vanadium oxide, indium-tin oxide, tantalum methoxide, dodecyl mercapto gold, indium acetylacetonate, etc.

23. The silver ink composition as set forth in claim 17, wherein the ink composition further include at least any one component selected from a group consisting of solvent, stabilizer, binder, surfactant, dispersant, coupling agent, wetting agent, thixotropic agent, or leveling agent.

24. The silver ink composition as set forth in claim 23, wherein the stabilizer is at least one selected from amine compounds consisting of primary amine, secondary amine, or tertiary amine; ammonium carbamate compound of a formula 2 below, ammonium carbonate compound of a formula 3 below, and ammonium bicarbonate of a formula 4, or sulfide compounds,

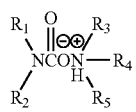 [Formula 2]

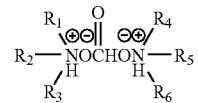 [Formula 3]

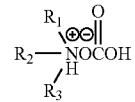 [Formula 4]

in the formulas, $R_1$ to $R_6$ are substituents independently selected from hydrogen, $C_1$-$C_{30}$ aliphatic or cycloaliphatic alkyl group or aryl or aralkyl group, which is the mixture thereof, alkyl and aryl group where functional group is substituted and heterocyclic compound and polymer compound and the derivatives thereof; and $R_2$ and, independently, $R_4$ and $R_5$ may form a ring by being connected in alkylene independently including heteroatom or not including thereof, with a proviso that not all of $R_1$ through $R_6$ are hydrogen.

25. The silver ink composition as set forth in claim 24, wherein the sulfide compound is selected from the compound represented by a formula 6, a formula 7 or a formula 6, $R_3P$ [Formula 6]

$(RO)_3P$ [Formula 7]

$(RO)_3PO$ [Formula 8]

in the formulas, R is a substituent selected from alkyl group or aryl group having the number of carbons of 1 to 20.

26. The silver ink composition as set forth in claim 24, wherein the sulfide compound is selected from butanethiol, n-hexanethiol, diethyl sulfide, tetrahydrothiophene.

27. The silver ink composition as set forth in claim 23, wherein the binder is any one or more selected from acryl, cellulose, polyester, polyamide, polyether, vinyl, urethane, urea, alkyd, silicon, fluorine, olefin, paraffin oil, rosin, epoxy, unsaturation polyester, dially phthalate resin, phenol, oxetane, oxazine, bismaleide, modified silicon, melamine, acryl-based resin, rubber, natural polymer, glass resin, glass frit.

28. A method for a thin film:
forming a thin film by applying the silver ink composition as set forth in claim 17 and then, performing an oxidation process, a reduction process, a heat process, an infrared ray process, an ultraviolet ray process, an electro beam process, or a laser process thereto.

29. The method as set forth in claim 28, wherein the thin film is applied and formed on a substrate.

30. The method as set forth in claim 28, wherein the application is performed by means of a printing method selected from a dispensing, an ink jet printing, an offset printing, a screen printing, a pad printing, a gravure printing, a flexography printing, a stencil printing, an imprinting, a xerography, or a lithography.

* * * * *